United States Patent
Joffe et al.

(10) Patent No.: US 11,507,586 B2
(45) Date of Patent: Nov. 22, 2022

(54) DATABASE TABLE ANNOTATION PROCESSING

(71) Applicant: ActionIQ, Inc., New York, NY (US)

(72) Inventors: Nitay Joffe, Bronx, NY (US); Mitesh Patel, Chicago, IL (US); Justin DeBrabant, Florham Park, NJ (US)

(73) Assignee: ActionIQ, Inc., New York, NY (US)

( * ) Notice: Subject to any disclaimer, the term of this patent is extended or adjusted under 35 U.S.C. 154(b) by 0 days.

(21) Appl. No.: 17/004,807

(22) Filed: Aug. 27, 2020

(65) Prior Publication Data
US 2022/0067049 A1     Mar. 3, 2022

(51) Int. Cl.
*G06F 16/2457*     (2019.01)
*G06F 16/2455*     (2019.01)
*G06F 16/22*       (2019.01)
*G06F 16/2452*     (2019.01)

(52) U.S. Cl.
CPC .... *G06F 16/24573* (2019.01); *G06F 16/2282* (2019.01); *G06F 16/24522* (2019.01); *G06F 16/24553* (2019.01)

(58) Field of Classification Search
CPC ......... G06F 16/24573; G06F 16/24553; G06F 16/2282; G06F 16/24522; G06F 16/256
See application file for complete search history.

(56) References Cited

U.S. PATENT DOCUMENTS

| | | | |
|---|---|---|---|
| 5,721,904 A | 2/1998 | Ito | |
| 8,458,200 B2 | 6/2013 | Dettinger | |
| 8,676,863 B1 * | 3/2014 | Connell | G06F 16/284 707/804 |
| 2005/0125447 A1 | 6/2005 | Cragun | |
| 2013/0132911 A1 * | 5/2013 | Rotshtein | G06F 16/838 715/854 |
| 2018/0165320 A1 * | 6/2018 | Schaude | G06F 16/235 |

OTHER PUBLICATIONS

SQL Select Into Statement, pp. 1-2, (Year: 2014).*
Extended European Search Report for App. No. EP21193562.2, dated Feb. 2, 2022, 10 pages.

* cited by examiner

*Primary Examiner* — Albert M Phillips, III
(74) *Attorney, Agent, or Firm* — Butzel Long

(57) ABSTRACT

Systems and techniques are provided for database table annotation processing. An annotation processing engine on a computing device may receive an instruction to build a database table. The annotation processing engine on the computing device may receive annotations made to the database table from a storage of the computing device. The annotations may include labels identifying features of the database table. The annotation processing engine on the computing device may determine a database server engine compatible with the database table. The annotation processing engine on the computing device may generate a query in a native language of the database server engine compatible with the database table based on the instruction to build the database table and the annotations made to the database table. The annotation processing engine on the computing device may send the query in the native language of the database server engine to the database server engine.

19 Claims, 12 Drawing Sheets

DATABASE TABLE ANNOTATION PROCESSING

BACKGROUND

Working with database tables from different sources may be difficult. The database tables may be formatted for use with different database server engines and may have different schema. Attempting to work with databases that are formatted for use with different database server engines at the same time may require run-time knowledge of the database tables in the databases, and the different database server engines the databases are formatted to work with, so that appropriate queries can be written for the different databases.

BRIEF SUMMARY

According to implementations of the disclosed subject matter, an annotation processing engine on a computing device may receive an instruction to build a database table. The annotation processing engine on the computing device may receive annotations made to the database table from a storage of the computing device, the annotations including labels identifying features of the database table. The annotation processing engine on the computing device may determine a database server engine compatible with the database table. The annotation processing engine on the computing device may generate a query in a native language of the database server engine compatible with the database table based on the instruction to build the database table and the annotations made to the database table. The annotation processing engine on the computing device may send the query in the native language of the database server engine to the database server engine.

Systems and techniques disclosed herein may allow for database table annotation processing. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
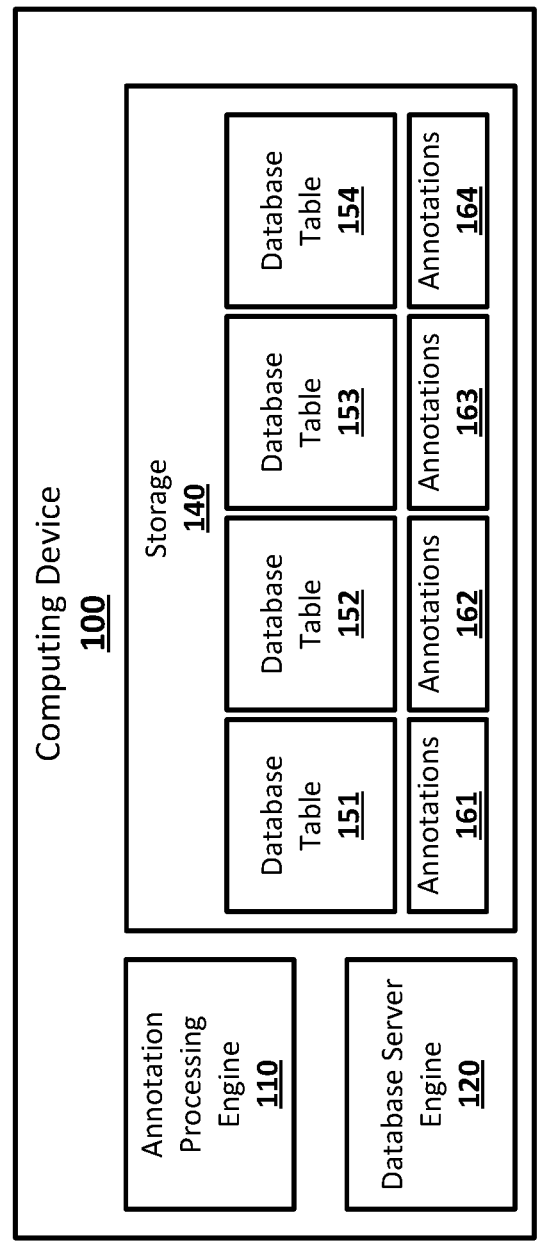
FIG. 1 shows an example system suitable for database table annotation processing according to an implementation of the disclosed subject matter.

According to embodiments disclosed herein, database table annotation processing may be used to process database tables that have been annotated. The database tables may be annotated using annotations that are part of an annotation system, including an annotation language and an annotation processor. Annotations may be made to database tables using the annotation language. The annotations may identify features that are common to database table schemas across different database table formats and specify operations that may be performed on database tables. The annotated database tables may be processed according to the annotations made to the annotated database tables. Processing an annotated database table may include using the annotations to generate query operations in the native language of a database server engine to query the annotated database tables, including building annotated database tables and running a query for data from a built database table.

Annotations may be made to database tables using an annotation language. For example, a database table may be examined to identify common features of the database table's schema that may be used as annotations to the database table. The identified common features may be features of the database table that are identified differently in database tables formatted for use with different database server engines. For example, a common feature, such as a primary key for a database table, may be identified differently in a database table formatted for use with MySQL than in a database table formatted for use with Apache Spark™. The identified common features may include, for example, the database table name, primary key, secondary key, and version key. Annotations made based on identified common features may include both a label for the common feature and the identity of the common feature in the database table to which the annotation is being made.

Annotations may specify operations that may be performed on database tables. For example, annotations made to a database table may indicate that query operations, such as join operations, filtering operations, and operations to add columns, should be performed on the database table when building the database table before it is made available for additional query operations. An annotation made to a database table may, for example, specify that all rows of a database table that include a null entry in a "description" column be filtered out, leaving only rows with non-null entries in the "description" column. The presence of the annotation for the filter operation in the annotations made to a database table may indicate that the filter operation should be performed before the database table is made available for additional querying, so that any queries run against the database table won't be run against the rows of the database table that include null entries in their "description" column. This may allow for database tables that include data that may not be useful for the purposes for which the database table will be used to be filtered down to useful data before the database table is queried.

An annotation made to a database table may specify a join operation. The annotation may instruct the joining of the database table with another database table before the database table is made available for additional queries. For example, a database table named "users" may have an annotation that indicates that it should be joined with a second database table named "orders" at the column "id" in the "users" database table and the column "userID" in the "orders" database table. The join operation specified in the annotation made to the database table named "users" may be performed whenever the database table named "users" is going to be made available for querying.

For example, a database table may be annotated with:

TABLE 1

Annotation(name = "users", primaryKey ="id",
versionKey="lastUpdated", joins = [Join(destTable="orders",
srcColumn="id", destColumn="userid")]))

where the label "name" may identify the name of database table as "users", the label "primaryKey" may identify the primary key of the database table as "id", the label "versionKey" may identify the version key of the database table as "lastUpdated", and the "joins" annotation may specify that the database table is to be joined with a database table named "orders" at the column labeled "id" in the "names" database table and the column labeled "userId" in the "orders" database table when the "users" database table is built. Any database table to which the annotations are made may similarly have its name identified in its annotations with the label "name", primary key identified in its annotations with the label "primaryKey", version key identified in its annotations with the label "versionKey", and so on for any other common features identified in the database table, regardless of the database server engine the database table is formatted for. The annotation language used in the annotations may be consistent across database tables from all sources.

Another database table may, for example, be annotated with:

TABLE 2

Annotation(name="product_description", primaryKey = "id",
filter=NotNull("description"))

where the label "name" may identify the name of database table as "product_description", the label "primaryKey" may identify the primary key of the database table as "id", and the "filter" annotation may instruct that the database table is to be filtered down to rows whose entry in the "description" column is not null when the database table is built to be made available for querying.

Another database table may, for example, be annotated with:

TABLE 3

Annotation(name = "orders", primaryKey = "id",
joins[Join(destTable="product_description", srcColumn="product_id",
destColumn="id")], addColumns=
[AddColumn(destTable="product_description",
destColumnToAdd="description")])

where the label "name" may identify the name of database table as "orders", the label "primaryKey" may identify the primary key of the database table as "id", the "joins" annotation may instruct that the database table is to be joined with the database table named "product_description" at the column labeled "product_id" in the "orders" database table and the column labeled "id" in the "product_description" database table when the database table is built to be made available for querying, and the "addColumns" command may instruct that the column labeled "description" from the "product_description" database table be added to the "orders" database table when the database table is built to be made available for querying.

Annotations made to a database table may also, for example, indicate how the data in the database table is obtained and updated. For example, an annotation made to a database table may indicate whether the database table is updated using a delta, via snapshot, or is an append-only table. Such an annotation may be used to determine the appropriate manner in which the data in the database table should be updated when new data for the database table is available.

Annotations made to database tables may be made using the annotation language. The annotation language may be the same regardless of the database server engine the database table is formatted to work with. This may allow annotations made to database tables to be consistent across database tables from different sources, having differing formats, and being compatible with different database server engines that may have their own, distinct, native languages for writing queries.

Annotations may be made to database tables by, for example, a person who examines the database tables, or through any suitable automated system. The annotations may be stored in any suitable manner. For example, the annotations made to a database table may be stored as metadata for that database table, either as part of a file or group of files that store the database table, or in a separate file that is associated with the database table. Annotations made to various database tables may be stored separately, or may, for example, be stored in a single table that acts as a metadata file for all of database tables to which the annotations were made.

The database tables may be processed according to their annotations. Processing a database table may include using the annotations to construct queries for querying the database table. Queries that apply operations specified in the annotations made to a database table may be applied to the database table at different times, for example, depending on the nature of the operation. Some operations from a database table's annotations may be applied at run-time, while other operations may be applied immediately after the annotation is made to the database table. Some operations specified in the annotations made to a database table may be applied whenever the database table is loaded to be made available to be queried, for example, when the database table is built.

The annotations made to a database table may be used to automatically generate a query that can be processed by the database server engine that the database table is formatted to work with. This may result in the generation of queries that are specific to a database server engine that an annotated database table is formatted for based on the annotation language, which may be agnostic to the database server engine the database table is formatted for and can therefore be used with any database table formatted for use with any database server engine.

The queries may be generated from the annotations by a component separate from any database server engine. For example, an annotation processing engine may run alongside, and interact with, a database server engine. A user may submit a command or query into the annotation processing engine, which may, based on the user-submitted command or query and the annotations of any database table specified in the user-submitted command, generate a query intended for a database server engine. For example, the annotation processing engine may be instructed, by a user, to build the "users", "orders", and "product_description" database tables. A command given to the annotation processing engine may be, for example, "Build Table1", where Table1 may be the name given in the annotation language to the "users" database table. The annotation processing engine may use the annotations made to the "users" database table to generate a query in the native language of the database server engine that the "users" database table is formatted for.

For example, in response to the command to build the "users" database table, the annotation processing engine may use the annotations made to the "users" database table to generate a query for a MySQL database server engine of:
(select first_by(t1.*, 0−t1.lastUpdated) from users group by id) as users_built
This query, when submitted for processing by the MySQL database server engine, may perform the operations included in the annotations for the "users" database table, including performing the join operation joining the "users" database table and the "orders" database table, with the result being the "users_built" database table that may have further query operations performed on it.

The same annotations made to the "users" database table may be used by the annotation processing engine to generate a query for an Apache Spark™ database server engine of:
spark.read("s3://users_raw").partitionBy("id").sortWithinPartitions("id").dropDuplicates("id", "last_updated")
This command, when submitted for processing by the Apache Spark™ database server engine, may perform the operations included in the annotations for the "users" database table, including performing the join operation joining the "users" database table and the "orders" database table. Thus, the same annotations may be used whether the "users" database table is formatted for use with MySQL, Apache Spark™, or any other suitable database server engine. The user of the annotation processing engine does need any knowledge of the language for MySQL, Apache Spark™, or any other database server engine, as they only need to write queries using the annotation language.

Similarly, a query submitted to the annotation processing engine to build Table2, the "product_description" database table, may result in the generation of a MySQL query of:

(select * from product_description where description IS NOT NULL) as product_description_built or an Apache Spark™ query of:
spark.read("s3://product_description_raw").filter($"description".nonNull)

A query submitted to the annotation processing engine to build Table3, the "orders" database table, may result in the generation of a MySQL query of:

(select t1.*, t2.description from orders t1 left join product_description_built
t2 on t2.id = t1.product_id) as orders_builtor an Apache Spark ™ query of:
spark. read("s3://orders raw").join(spark.read("s3://product_description_built"), "id', "product_id"))

The annotation processing engine may automatically handle any dependencies among database tables when generating a query. For example, building the "orders" database table, Table3, requires that the "product_description" database table, Table2, be built first. Any query submitted to the annotation processing engine to build the "orders" database table would result in the generation and execution of a query to build the "product_description" database table, as the annotations for the "orders" database table include a join that references the "product_description" database table. The annotation processing engine may be able to do a topological sorting of any dependences among database tables using the annotations made to the database tables to ensure that any database tables that are required to successfully build another database table are built first. A user may not need to have any understanding of the relationship between database tables when commanding that a database table be built using the annotations processor engine.

The annotation processing engine may be used to generate query operations after a database table has been built. The query operation may be written using the annotation language instead of the language of the database server engine that the database table being queried is formatted for. The annotation language may incorporate a single native language for an existing database server engine, such as SparkSQL, a combination of native languages for existing database server engines, or a separate language created for use as part of the annotation language, for writing query operations to be run against a built database table. For example, the annotation language may incorporate SparkSQL, and a query operation that returns all of the user ids from the "users" database table for users who ordered a product called "widget" may be written using the annotation language as:

select t1.id from users_built t1 join orders_built t2 on t1.id=t2.userId where t2.description="widget"

This written form of the query operation may be less complicated than if it were written using a native language for MySQL, which would result in the query operation being written as:

```
select t1.id from (select first_by(t1.*, 0 - t1.lastUpdated) from users group
by id) t1 join (select t1.*, t2.description from orders t1 left join (select *
from product_description where description IS NOT NULL) t2 on
t2.id = t1 .product_id) t2 on t1.id = t2.userId where t2.description =
"widget"
```

The query operation as written for a MySQL database server engine may also be more inefficient, as it does not initially filter out rows with a null entry in the description column, resulting in those rows being processed. The annotations on the "product_description" database table may result in the rows with a null entry in the description column being filtered out before the "product_description" database table is joined with the "orders" database table based on the annotations on the "orders" database table before the "orders" database table is then joined with the "users" database table based on the annotations on the "users" database table. Since the database tables are built according to their annotations before a search is performed for "widget" in the description column, the rows with a null entry in the description column are not processed, having already been filtered out.

Similarly, the query operation written for an Apache Spark™ database server engine may be:

```
spark. read("s3://users_raw").partitionBy("id").sortWithinParti-
tions("id").dropDuplicates("id", "last_updated").join(spark.read("s3://or-
ders_raw").join(spark.read("s3://product _descrip-
tion_raw").filter($"description".nonNull), "id', "product_id")),"id",
"userid")).filter($"description" === "widget")
```

The written form of the query operation in the native language used with an Apache Spark™ database server engine may be more complicated than the query operation as written in the annotation language, and may be more inefficient, as the query operation as written for Apache Spark™ may read the same rows repeatedly.

FIG. 1 shows an example system suitable for database table annotation processing according to an implementation of the disclosed subject matter. A computing device 100 may include an annotation processing engine 110, a database server engine 120, and storage 140. The computing device 100 may be any suitable device, such as, for example, a computer 20 as described in FIG. 7, for implementing the annotation processing engine 110, the database server engine 120, and the storage 140. The computing device 100 may be a single computing device, or may include multiple connected computing devices, and may be, for example, a laptop, a desktop, an individual server, a server farm, or a distributed server system, or may be a virtual computing device or system. The computing device 100 may be part of a computing system and network infrastructure, or may be otherwise connected to the computing system and network infrastructure. The annotation processing engine 110 may be any suitable combination of hardware and software for processing annotations made to database tables and generating queries in the native language of the database server engine 120 based on input in an annotation language. The database server engine 120 may be any suitable combination of hardware and software for querying database tables that are in a format compatible with the database server engine 120. The storage 140 may be any suitable combination of hardware and software for implementing any suitable combination of volatile and non-volatile storage, which may store database tables and annotations made to the database tables.

The annotation processing engine 110 may be any suitable combination of hardware and software for processing annotations made to database tables and generating queries in the native language of the database server engine 120 based on input in an annotation language. The annotation processing engine 110 may be implemented in any suitable manner, including using any suitable programming language, such as Scala. The annotation processing engine 110 may operate based on an annotation language, forming an annotation system for database tables. The annotation language may be used to make annotations to database tables and to write query operations used to query the database tables. The annotation processing engine 110 may be able to receive an input of a query intended for a database table in the storage 140 and written in the annotation language, and generate a query in a native language of the database serve engine 120 based on the received query and annotations made to the database table. The annotation processing engine 120 may send any queries generated in the native language of the database serve engine 120 to the database server engine 120 to be processed. This may result in the database server engine 120 building a database table according to the query or otherwise running a query against a database table and returning results of the query.

The database server engine 120 may be any suitable combination of hardware and software for querying database tables that are in a format compatible with the database server engine 120. The database server engine 120 may, for example, be any available database server engine, such as a MySQL or Apache Spark™ database server engine. The database server engine 120 may operate based on a native language of the database server engine 120 that may be used to write queries for the database server engine 120. The database server engine 120 may, in response to queries written in the native language of the database server engine 120, query database tables in the storage 140 that are in a format that is compatible with the database server engine 120. The database server engine 120 may, for example, run a query against a database table to return results, for example, to a user. The database serve engine 120 may build a database table, for example, generating and storing a view of a database table in the storage 140 based on a query and making the built database table available to be queried against.

The storage 140 may be any suitable storage hardware connected to the computing device 100. For example, the storage 140 may be a component of the computing device, such as a magnetic disk, flash memory module or solid state disk, or may be connected to the computing device 100 through any suitable wired or wireless connection. The storage 140 may be a local storage, i.e., within the environment within which the computing device 100 operates, or may be partially or entirely operated on a remote server. The storage 140 may store database tables, such as database tables 151, 152, 153, and 154, and annotations made to database tables, such as annotations 161, 162, 163, and 164 made to, respectively, the database tables 151, 152, 153, and 154.

The database tables 151, 152, 153, and 154 may be database tables obtained from any suitable data source, and may include any suitable data. The database tables 151, 152, 153, and 154 may be in any suitable format. For example, the database tables 151, 152, and 153 may be in a format compatible with the database server engine 120, and the database table 154 may be a in a format compatible with a different database server engine.

The annotations 161, 162, 163, and 164 may be annotations made, respectively, to the database tables 151, 152, 153, and 154, using the annotation language. The annotations 161, 162, 163, and 164 may have been made in any suitable manner, including, for example, through human or automated review of the database tables 151, 152, 153, and 154. The annotations 161, 162, 163, and 164 may identify common features of the database tables 161, 162, 163, and 164, including, for example, primary keys, secondary keys, version keys, and tables names, and may include query operations to be performed on the database tables 151, 152, 153, and 154 when the database tables 151, 152, 153, and 154 are built, including, for example, filter and join operations. The annotations 161, 162, 163, and 164 may be stored as metadata for the database tables 151, 152, 153, and 154 in any suitable manner. For example, the annotations 161 may be metadata for the database table 151, and may be stored as a separate file from the database table 151, or may be appended to the file for the database table 151 in any suitable manner. The annotations 161, 162, 163, and 164 may also be stored, for example, as a separate database table.

Figure 2A:
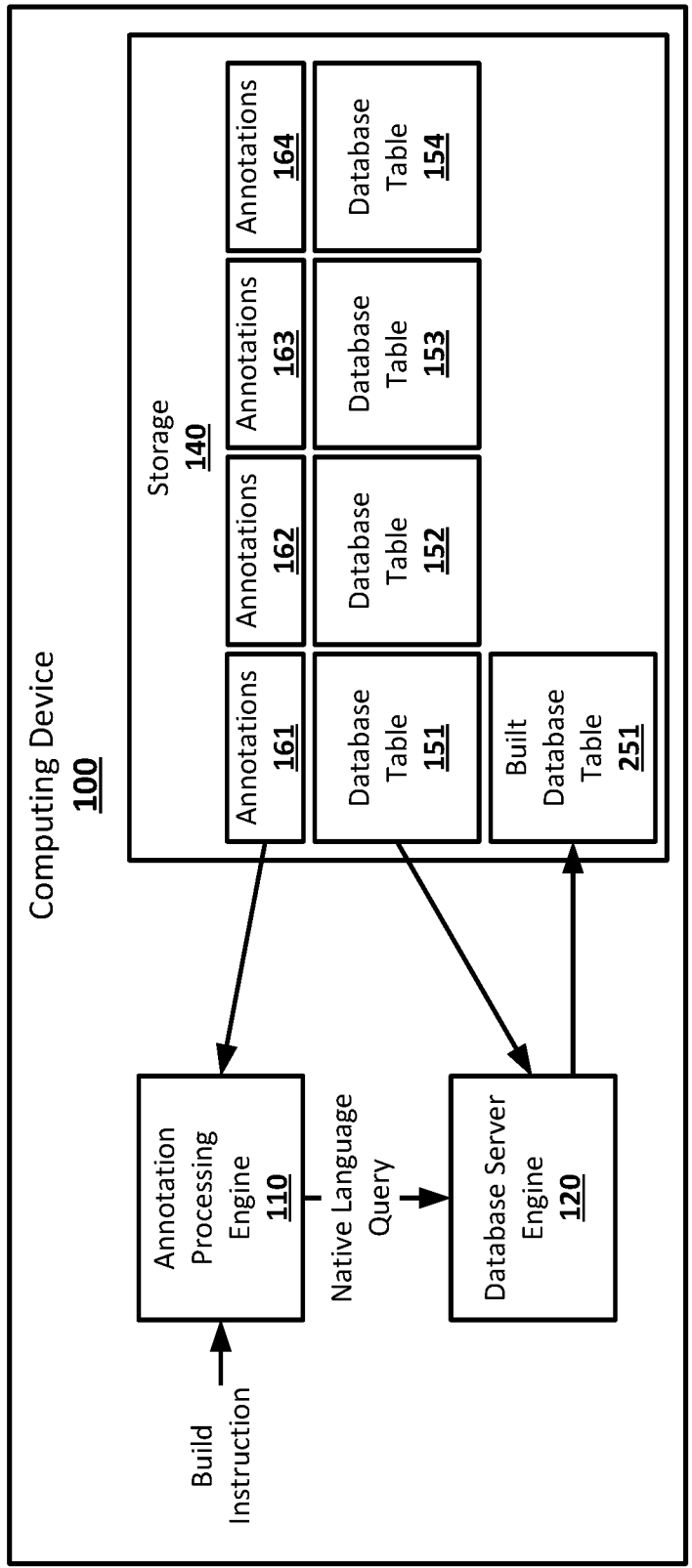
FIG. 2A shows an example arrangement suitable for database table annotation processing according to an implementation of the disclosed subject matter.

FIG. 2A shows an example arrangement suitable for database table annotation processing according to an implementation of the disclosed subject matter. A build instruction may be input to the annotation processing engine 110. The build instruction may be an instruction from any suitable source, including, for example a user, or from another process running on or component of the computing device 100 or other computing device, to build a database table from the storage 140 so that the database table can be queried. The build instruction may be an explicit instruction to build a database table or an inferred instruction. For example, a query submitted to the annotation processing engine 110 that is meant to be run against a database table that has had annotations made to it may be read by the annotation processing engine 110 as an implicit instruction to build that database table before the database table is queried against. The build instruction may, for example, instruct the building of the database table 151.

The annotation processing engine 110 may output a native language query. For example, the annotation processing engine 110 may use the build instruction and the annotations 161 retrieved from the storage 140 and associated with the database table 151 to generate a native language query that may be used to build the database table 151. The native language query may be in the native language of the database server engine 120, and may incorporate any query operations, such as join and filter operations, and parameters from the annotations 161. The annotation processing engine 110 may use the annotations 161 to identify any features of the database table 151 that may need to be specified in the native language query. For example, the annotations 161 may be "Annotation(name="product_description", primaryKey="id", filter=NotNull("description"))", and the annotation processing engine 110 may generate a native language query of "(select * from product_description where description IS NOT NULL) as product_description_built". The annotation processing engine 110 may output the native language query to the database serve engine 120 in any suitable manner, including, for example, through an API call to the database server engine 120 or through the use of a command-line utility that may call the database serve engine 120.

The database server engine 120 may build the database table based on the native language query received from the annotation processing engine 110. For example, the database server engine 120 may receive the native language query that provides instructions for building the database table 151 based on the annotations 161. The database server engine 120 may process the native language query against the database table 151, building database table 151 based on the native language query. The database table built from the database table 151 by the database server engine 120 may be stored as the built database table 251 in the storage 140. The built database table 251 may, for example, be a view of the database table 151, and may be made available to have queries run against it. For example, the native language query of "(select * from product_description where description IS NOT NULL) as product_description_built" may cause the database server engine 120 to build the database table 151 into the built database table 251 by filtering out any rows from the database table 151 which have a null entry in their "description" column.

The built database table 251 may be stored in the storage 140 in any suitable manner. For example, the built database table 251 may be stored in volatile storage, which may allow for faster querying of the built database table 251, and may be removed from the volatile storage and discarded, or moved into non-volatile storage for longer term storage, for example, based on additional instructions received at the annotation processing engine 110 or at suitable intervals or based on the occurrence of specified events, such as, for example an update to the database table 151 that causes the built database table 251 to be out of date. The built database table 251 may be associated with the database table 151 and the annotations 161, such that the annotations 161 may be used by the annotation processing engine 110 when generating a native language query to be run against the built database table 251 by the database server engine 120.

Figure 2B:
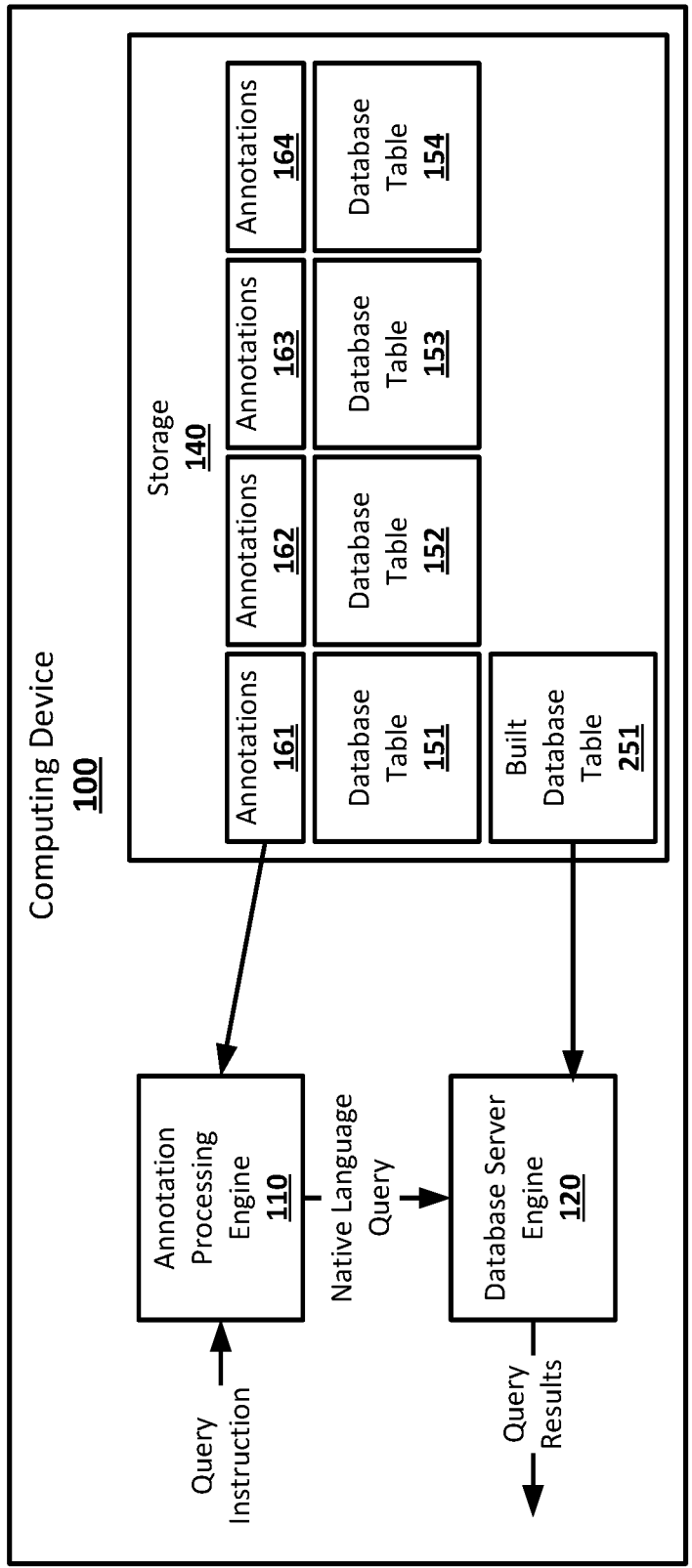
FIG. 2B shows an example arrangement suitable for database table annotation processing according to an implementation of the disclosed subject matter.

FIG. 2B shows an example arrangement suitable for database table annotation processing according to an implementation of the disclosed subject matter. The built database table 251 may be made available to be queried against. A query instruction may be input to the annotation processing engine 110. The query instruction may be an instruction from any suitable source, including, for example a user, or from another component of the computing device 100 or other computing device, to query a database table from the storage 140. The query instruction may, for example, instruct a query against the built database table 251, or a query against the database table 151. The query instruction may be written using the annotation language. The annotation language may incorporate a single native language for an existing database server engine, such as SparkSQL, a combination of native languages for existing database server engines, or a separate language created for use as part of the annotation language, for writing query operations to be run against a built database table. The annotation processing engine 110 may be able to use the portion of the annotation language used for writing query instructions to generate native language queries in the native language of any suitable database server engine.

The annotation processing engine 110 may output a native language query. For example, the annotation processing engine 110 may use the query instruction and the annotations 161 from the storage 140 and associated with the database table 151 to generate a native language query that may be used to query against the built database table 251. The native language query may be in the native language of the database server engine 120. The annotation processing engine 110 may use the annotations 161 to identify any features of the built database table 251 that may need to be specified in the native language query. For example, the query instruction received by the annotation processing engine 110 may be "select t1.id from product_descriptions t1 where t1.description="widget"". The annotation processing engine 110 may generate a native language query from the query instruction. The annotation processing engine 110 may output the native language query to the database server engine 120 in any suitable manner, including, for example, through an API call to the database server engine 120 or through the use of a command-line utility that may call the database serve engine 120.

The database server engine 120 may process the native language query received from the annotation processing engine 110 against the database table. For example, the database server engine 120 may receive the native language query meant to be run against the built database table 251 from the annotation processing engine 110. The database server engine 120 may run the query against the built database table 251. The results of the query may be returned by the database serve engine 120 in any suitable manner. For example, the query results may be displayed to a user, written to a file, or transmitted to another process running on or component of the computing device 100, or to another computing device using any suitable network connection.

Queries may be run against the built database table 251 any suitable number of times and for any suitable amount of time. For example, the built database table 251 may be available to be queried against until the database table 151 is updated, causing the built database table 251 to be out of date, at which the time the built database table 251 may be discarded and the database table 151 may be built again.

Figure 3A:
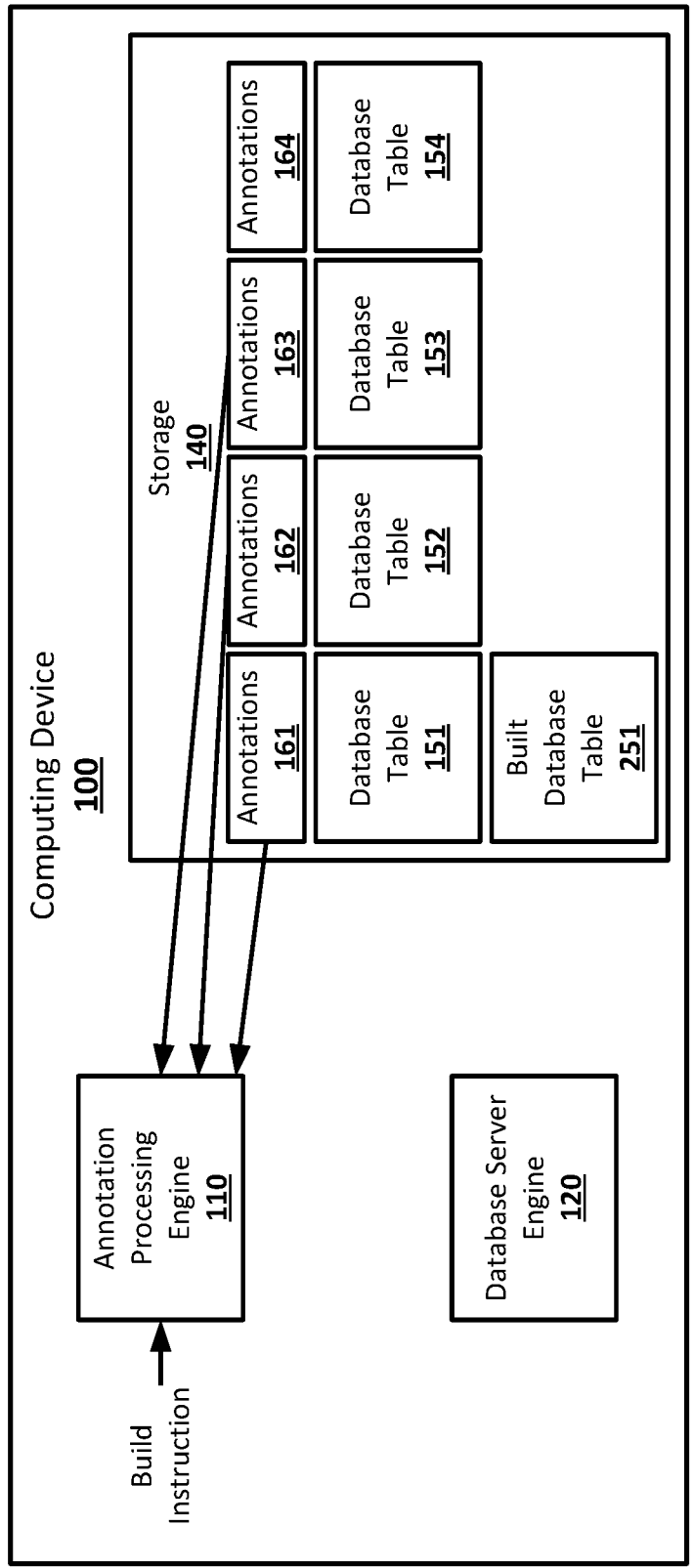
FIG. 3A shows an example arrangement suitable for database table annotation processing according to an implementation of the disclosed subject matter.

FIG. 3A shows an example arrangement suitable for database table annotation processing according to an implementation of the disclosed subject matter. A build instruction may be input to the annotation processing engine 110. The build instruction may be an instruction from any suitable source, including, for example a user, or from another process running on or component of the computing device 100 or other computing device, to build a database table from the storage 140 so that the database table can be queried. The build instruction may be an explicit instruction to build a database table or an inferred instruction. For example, a query submitted to the annotation processing engine 110 that is meant to be run against a database table that has had annotations made to it may be read by the annotation processing engine 110 as an implicit instruction to build that database table before the database table is queried against. The build instruction may, for example, instruct the building of the database table 153. The annotation processing engine 110 may access the annotations 163 from the storage 140. The annotation processing engine 110 may determine that the annotations 163 made to the database table 153 indicate that the database table 153 should be joined with the database table 152 when being built. The annotation processing engine 110 may then start the process of building the database table 152 by receiving the annotations 162 from the storage 140, and may determine that the annotations 162 indicate that the database table 152 should be joined with the database table 151 when being built. The annotation processing engine 110 may then start the process of building the database table 151 by receiving the annotations 161, and may determine that the annotations 161 don't indicate that another database table needs to be built in order for the database table 151 to be built. In this way, the annotation processing engine 110 may automatically handle dependencies in the building of database tables that are introduced by the annotations made to those database tables.

For example, the annotations 163 may be:

```
Annotation(name = "users", primaryKey = "id",
versionKey="lastUpdated", joins = [Join(destTable="orders",
srcColumn="id", destColumn="userid")]))
```

This may indicate that building the database table 153, which may be named "users", involves a join operation with a database table named "orders", which may, for example, be the database table 152. The annotations 162 may be:

```
Annotation(name = "orders", primaryKey = "id",
joins[Join(destTable="product_description",
srcColumn="product_id", destColumn="id")], addColumns=
[AddColumn(destTable="product_description",
destColumnToAdd="description")])
```

This may indicate that building the database table 152 involves a join operation with a database table named "product_description", which may, for example, be the database table 151. The annotations 161 may not indicate the necessity of another database table in the building of the database table 151.

Figure 3B:
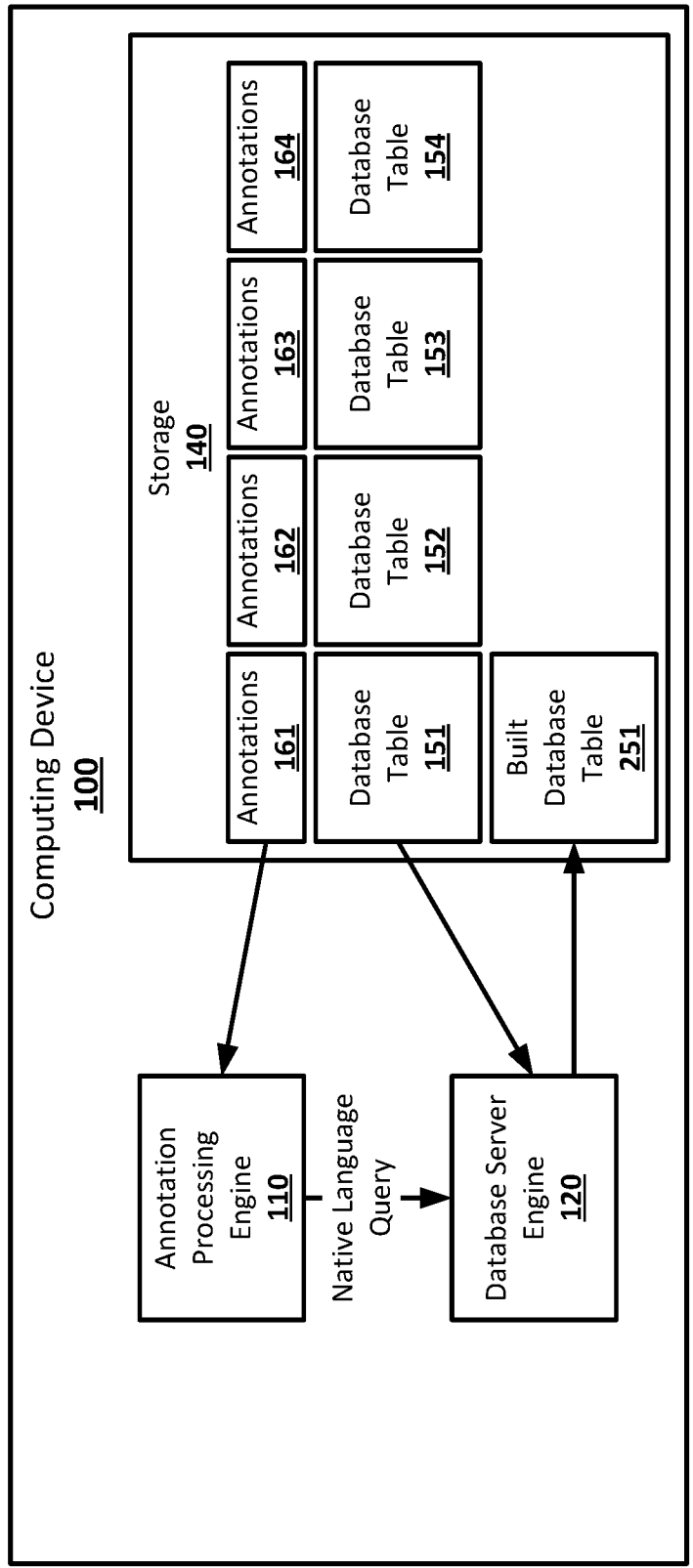
FIG. 3B shows an example arrangement suitable for database table annotation processing according to an implementation of the disclosed subject matter.

FIG. 3B shows an example arrangement suitable for database table annotation processing according to an implementation of the disclosed subject matter. After determining that the database table 151 can be built, the annotation processing engine 110 may output a native language query to cause the building of the database table 151. For example, the annotation processing engine 110 may use the annotations 161 retrieved from the storage 140 to generate a native language query that may be used to build the database table 151. The native language query may be in the native language of the database server engine 120. The annotation processing engine 110 may output the native language query to the database serve engine 120 in any suitable manner, including, for example, through an API call to the database server engine 120 or through the use of a command-line utility that may call the database serve engine 120.

The database server engine 120 may build the database table 151 based on the native language query received from the annotation processing engine 110. For example, the database server engine 120 may receive the native language query that provides instructions for building the database table 151 based on the annotations 161 and may build the database table 151 based on the native language query. The database table built from the database table 151 by the database server engine 120 may be stored as the built database table 251 in the storage 140.

Figure 3C:
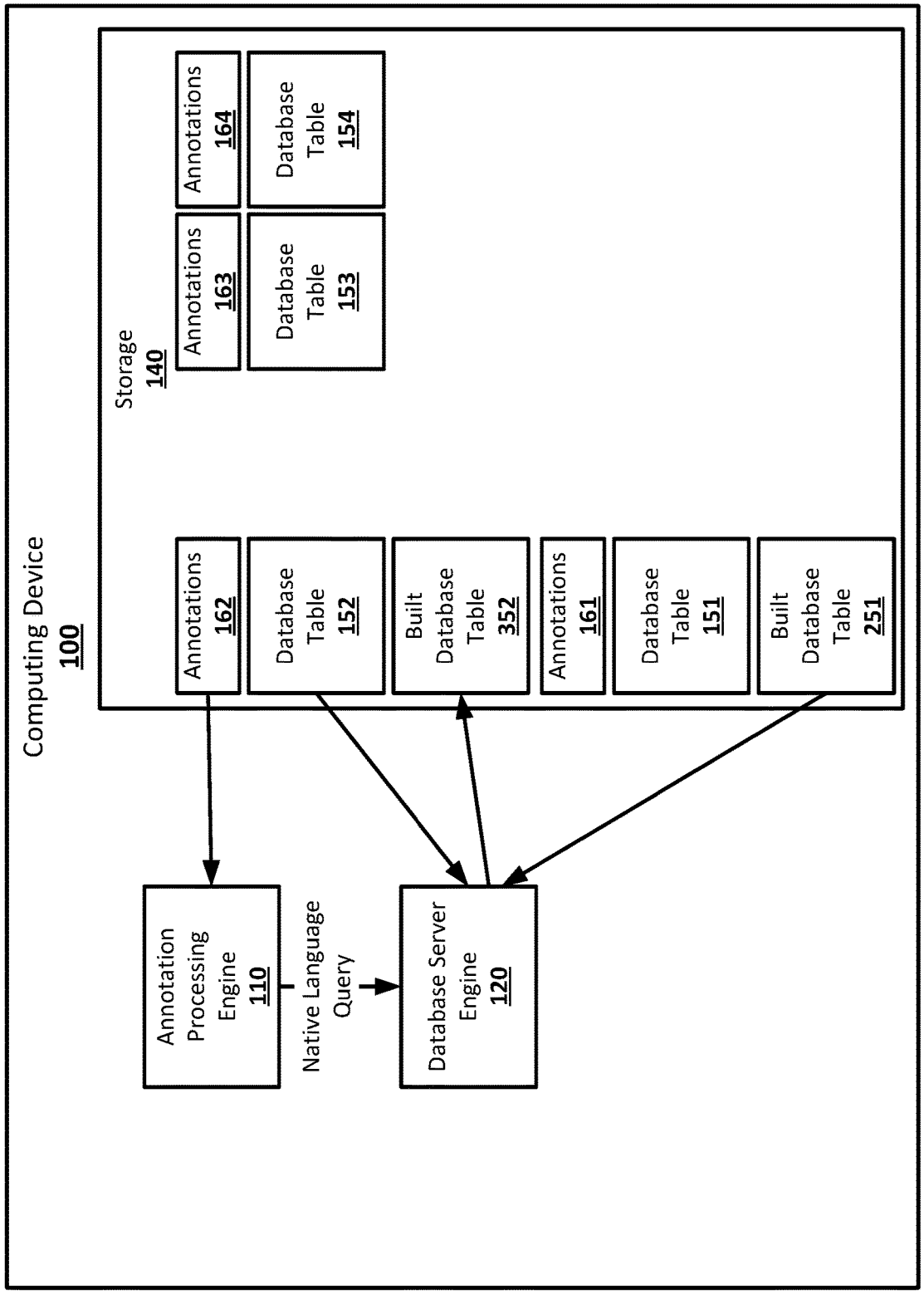
FIG. 3C shows an example arrangement suitable for database table annotation processing according to an implementation of the disclosed subject matter.

FIG. 3C shows an example arrangement suitable for database table annotation processing according to an implementation of the disclosed subject matter. After the database table 151 is built by the database server engine 120 and stored as the built database table 251, the annotation processing engine 110 may output a native language query to cause the building of the database table 152. For example, the annotation processing engine 110 may use the annotations 162 retrieved from the storage 140 to generate a native language query that may be used to build the database table 152. The native language query may be in the native language of the database server engine 120. The annotation processing engine 110 may output the native language query to the database serve engine 120 in any suitable manner, including, for example, through an API call to the database server engine 120 or through the use of a command-line utility that may call the database serve engine 120.

The database server engine 120 may build the database table 152 based on the native language query received from the annotation processing engine 110. For example, the database server engine 120 may receive the native language query that provides instructions for building the database table 152 based on the annotations 162 and may build the database table 152 based on the native language query using the built database table 251 as indicated in the annotations 162. The database table built from the database table 152, using the database table 251, by the database server engine 120 may be stored as the built database table 352 in the storage 140.

Figure 3D:
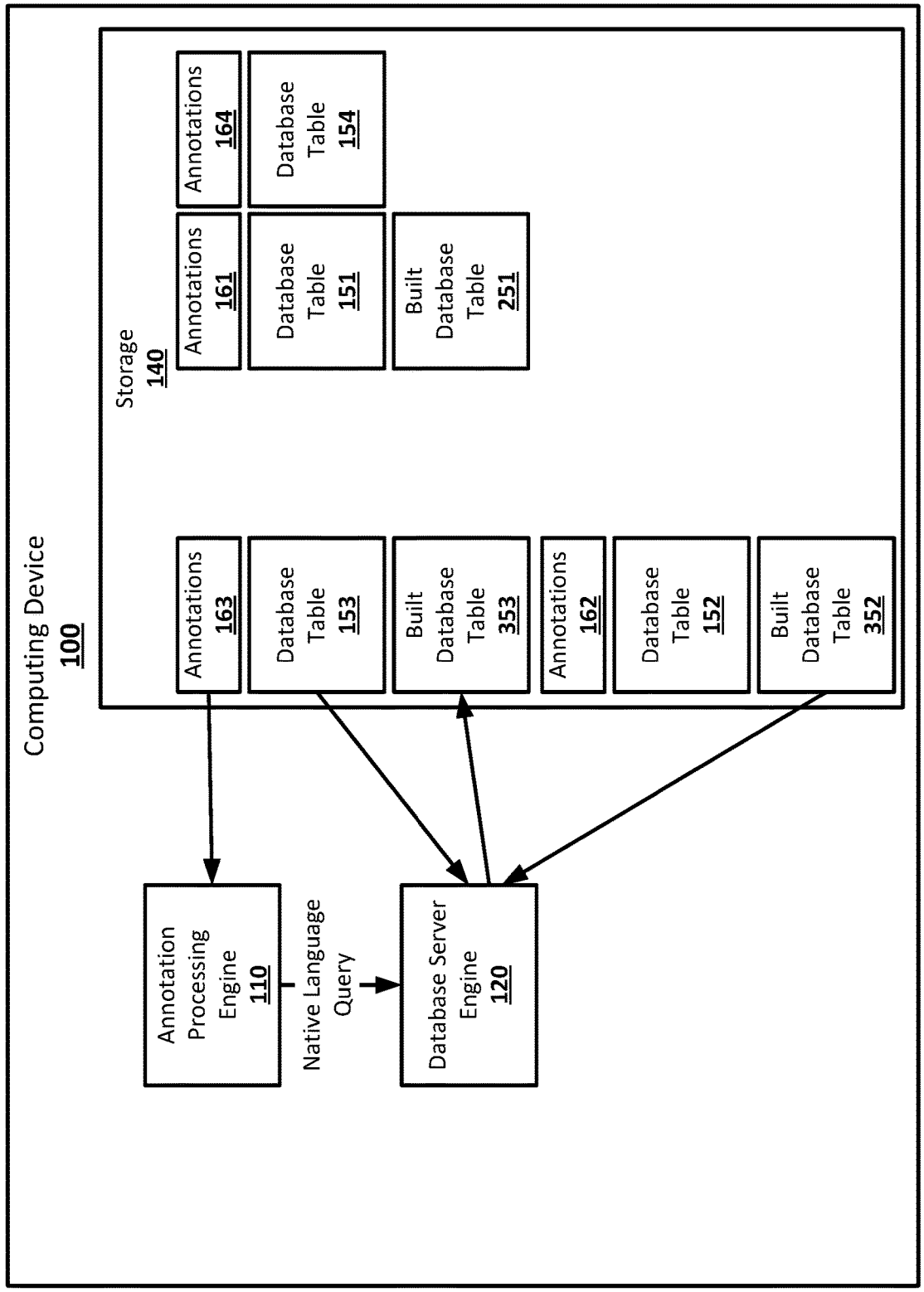
FIG. 3D shows an example arrangement suitable for database table annotation processing according to an implementation of the disclosed subject matter.

FIG. 3D shows an example arrangement suitable for database table annotation processing according to an implementation of the disclosed subject matter. After the database table 152 is built by the database server engine 120 and stored as the built database table 352, the annotation processing engine 110 may output a native language query to cause the building of the database table 153 in accordance with the original build instruction received by the annotation processing engine 110. For example, the annotation processing engine 110 may use the annotations 163 retrieved from the storage 140 to generate a native language query that may be used to build the database table 153. The native language query may be in the native language of the database server engine 120. The annotation processing engine 110 may output the native language query to the database serve engine 120 in any suitable manner, including, for example, through an API call to the database server engine 120 or through the use of a command-line utility that may call the database serve engine 120.

The database server engine 120 may build the database table 153 based on the native language query received from the annotation processing engine 110. For example, the database server engine 120 may receive the native language query that provides instructions for building the database table 153 based on the annotations 163 and may build the database table 132 based on the native language query using the built database table 252 as indicated in the annotations 163. The database table built from the database table 153, using the built database table 352, by the database server engine 120 may be stored as the built database table 353 in the storage 140. The built database table 353 may be made available to be queried against. The built database tables 251 and 352 may also be made available to be queried against, or may be discarded once the database table 153 has been built and stored as the built database table 353.

Figure 4A:
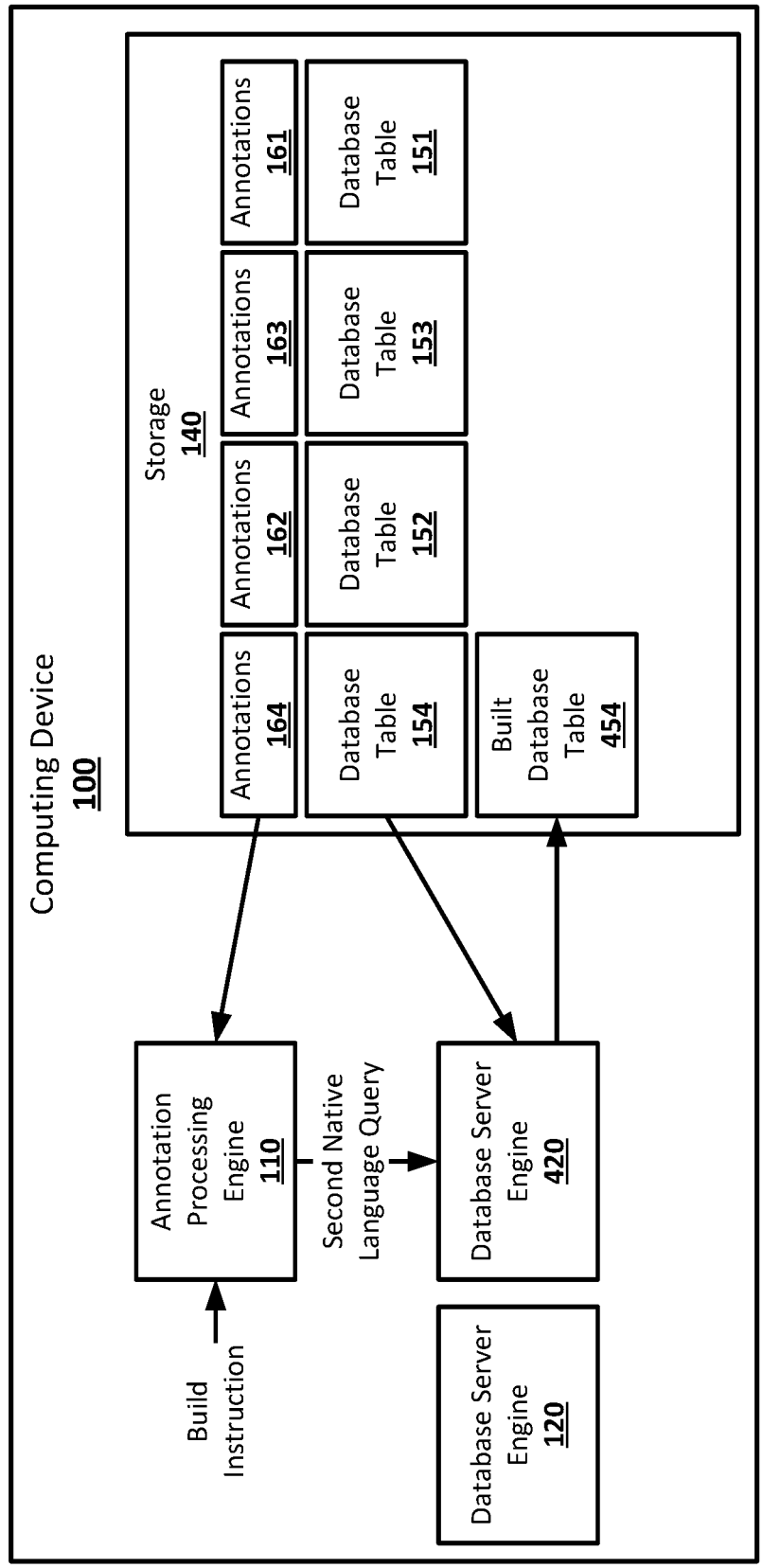
FIG. 4A shows an example arrangement suitable for database table annotation processing according to an implementation of the disclosed subject matter.

FIG. 4A shows an example arrangement suitable for database table annotation processing according to an implementation of the disclosed subject matter. In some implementations, the computing device 100 may include more than one database server engine. For example, the computing device 100 may include a database server engine 420 in addition to the database server engine 120. The database server engine 420 may be different than the database server engine 120, with a different native language, and database tables that are compatible with the database server engine 420 may be formatted different than database tables that are compatible with the database server engine 120. The storage 140 may, for example, include the database table 154, which may be formatted to be compatible with the database server engine 420. The annotations 164, which may be the annotations made to the database table 154, may be written the same annotations language, and stored in the same format and manner, as the annotations 161, 162, and 163. This may allow the annotation processing engine 110 to use the annotations 161, 162, 163, and 164 in the same manner even when the database tables the annotations were made to are in different formats.

A build instruction may be input to the annotation processing engine 110. The build instruction may be an instruction from any suitable source, including, for example a user, or from another process running on or component of the computing device 100 or other computing device, to build a database table from the storage 140 so that the database table can be queried. The build instruction may be an explicit instruction to build a database table or an inferred instruction. For example, a query submitted to the annotation processing engine 110 that is meant to be run against a database table that has had annotations made to it may be read by the annotation processing engine 110 as an implicit instruction to build that database table before the database table is queried against. The build instruction may, for example, instruct the building of the database table 151.

The annotation processing engine 110 may output a native language query in a second native language. For example, the annotation processing engine 110 may use the build instruction and the annotations 164 retrieved from the storage 140 and associated with the database table 154 to generate a native language query in a second native language that may be used to build the database table 154. The second native language query may be in the native language of the database server engine 420, different from the native language of the database server engine 420, and may incorporate any query operations, such as join and filter operations, from the annotations 164. The annotation processing engine 110 may use the annotations 164 to identify any features of the database table 154 that may need to be specified in the native language query. For example, the annotation processing engine 110 may generate a second native language query of "(spark.read("s3.//product_description_raw").filter($"description".nonNull)". The annotation processing engine 110 may output the native language query to the database serve engine 420 in any suitable manner, including, for example, through an API call to the database server engine 420 or through the use of a command-line utility that may call the database serve engine 420.

The database server engine 420 may build the database table based on the second native language query received from the annotation processing engine 110. For example, the database server engine 420 may receive the second native language query that provides instructions for building the database table 154 based on the annotations 164 and may build the database table 154 based on the second native language query. The database table built from the database table 154 by the database server engine 420 may be stored as the built database 454 in the storage 140. The built database table 454 may, for example, be a view of the database table 154, and may be made available to have queries run against it. For example, the native language query of ""(spark.read("s3://product_description_raw").filter($"description".nonNull)" may cause the database server engine 420 to build the database table 154 into the built database table 454 by filtering out any rows from the database table 154 which have a null entry in their "description" column. The built database table 454 may be stored in the storage 140 in any suitable manner. For example, the built database table 454 may be stored in volatile storage, which may allow for faster querying of the built database 454, and may be removed from the volatile storage and discarded, or moved into non-volatile storage for longer term storage, for example, based on additional instructions received at the annotation processing engine 110 or at suitable intervals or based on the occurrence of specified events, such as, for example an update to the database table 154 that causes the built database table 454 to be out of date. The built database table 454 may be associated with the database table 154 and the annotations 164, such that the annotations 164 may be used by the annotation processing engine 110 when generating a second native language query to be run against the built database table 454 by the database server engine 420.

Figure 4B:
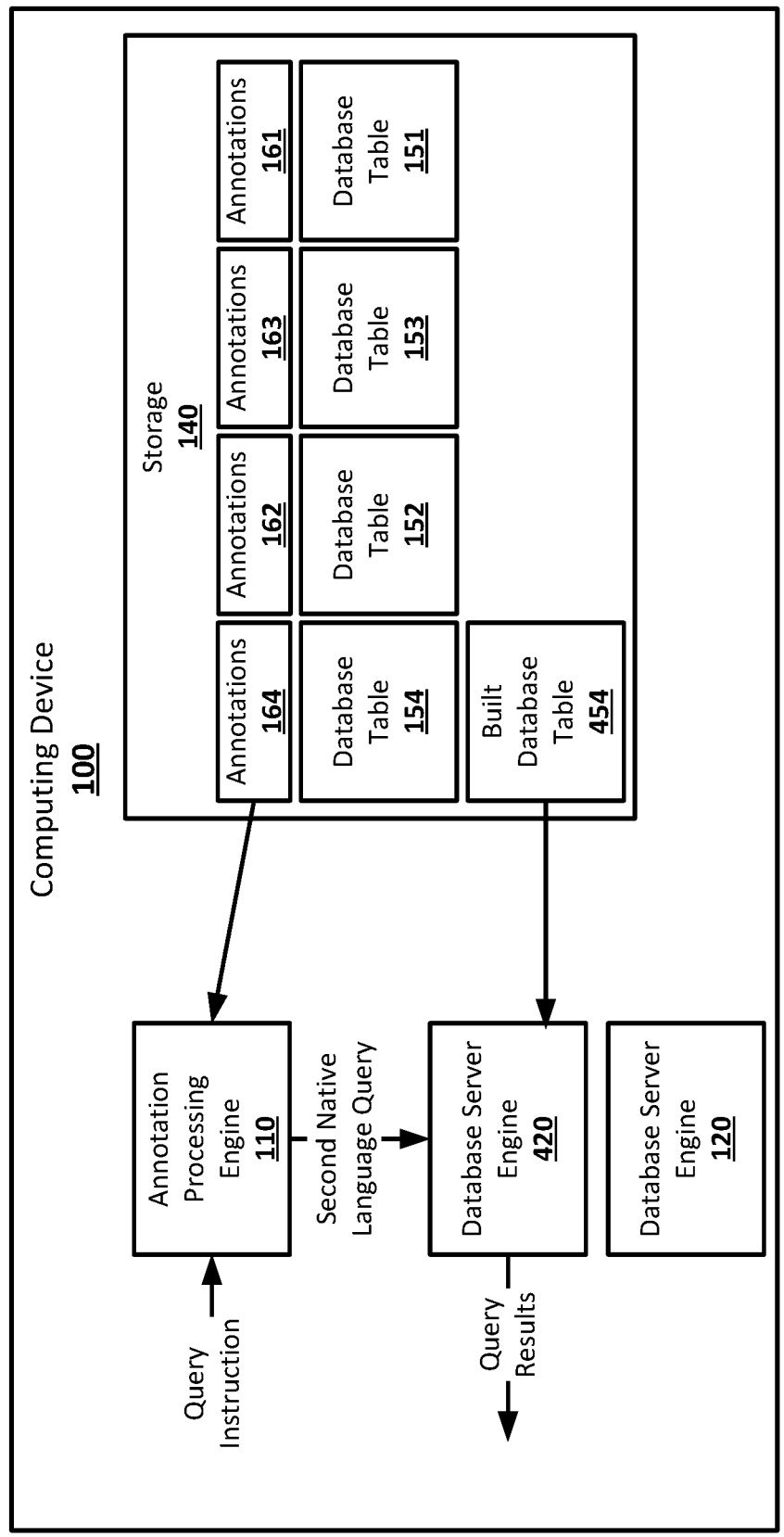
FIG. 4B shows an example arrangement suitable for database table annotation processing according to an implementation of the disclosed subject matter.

FIG. 4B shows an example arrangement suitable for database table annotation processing according to an implementation of the disclosed subject matter. The built database table 454 may be made available to be queried against. A query instruction may be input to the annotation processing engine 110. The query instruction may be an instruction from any suitable source, including, for example a user, or from another component of the computing device 100 or other computing device, to query a database table from the storage 140. The query instruction may, for example, instruct a query against the built database table 454.

The annotation processing engine 110 may output a second native language query. For example, the annotation processing engine 110 may use the query instruction and the annotations 164 retrieved from the storage 140 and associated with the database table 154 to generate a second native language query that may be used to query against the built database table 454. The second native language query may be in the native language of the database server engine 420. The annotation processing engine 110 may use the annotations 164 to identify any features of the built database table 454 that may need to be specified in the second native language query. For example, the query instruction received by the annotation processing engine 110 may be "select t1.id from product_descriptions t1 where t1.description="widget"". The annotation processing engine 110 may generate a second native language query from the query instruction. The annotation processing engine 110 may output the second native language query to the database serve engine 420 in any suitable manner, including, for example, through an API call to the database server engine 420 or through the use of a command-line utility that may call the database serve engine 420.

The database server engine 420 may run the second native language query against the database table based on the second native language query received from the annotation processing engine 110. For example, the database server engine 420 may receive the second native language query and run the second native language query against the built database table 454. The results of the query may be returned by the database serve engine 420 in any suitable manner. For example, the query results may be displayed to a user, written to a file, or transmitted to another process running on or component of the computing device 100, or to another computing device using any suitable network connection.

Queries may be run against the built database table 454 any suitable number of times and for any suitable amount of time. For example, the built database table 454 may be available to be queried against until the database table 154 is updated, causing the built database table 454 to be out of date.

Figure 5:
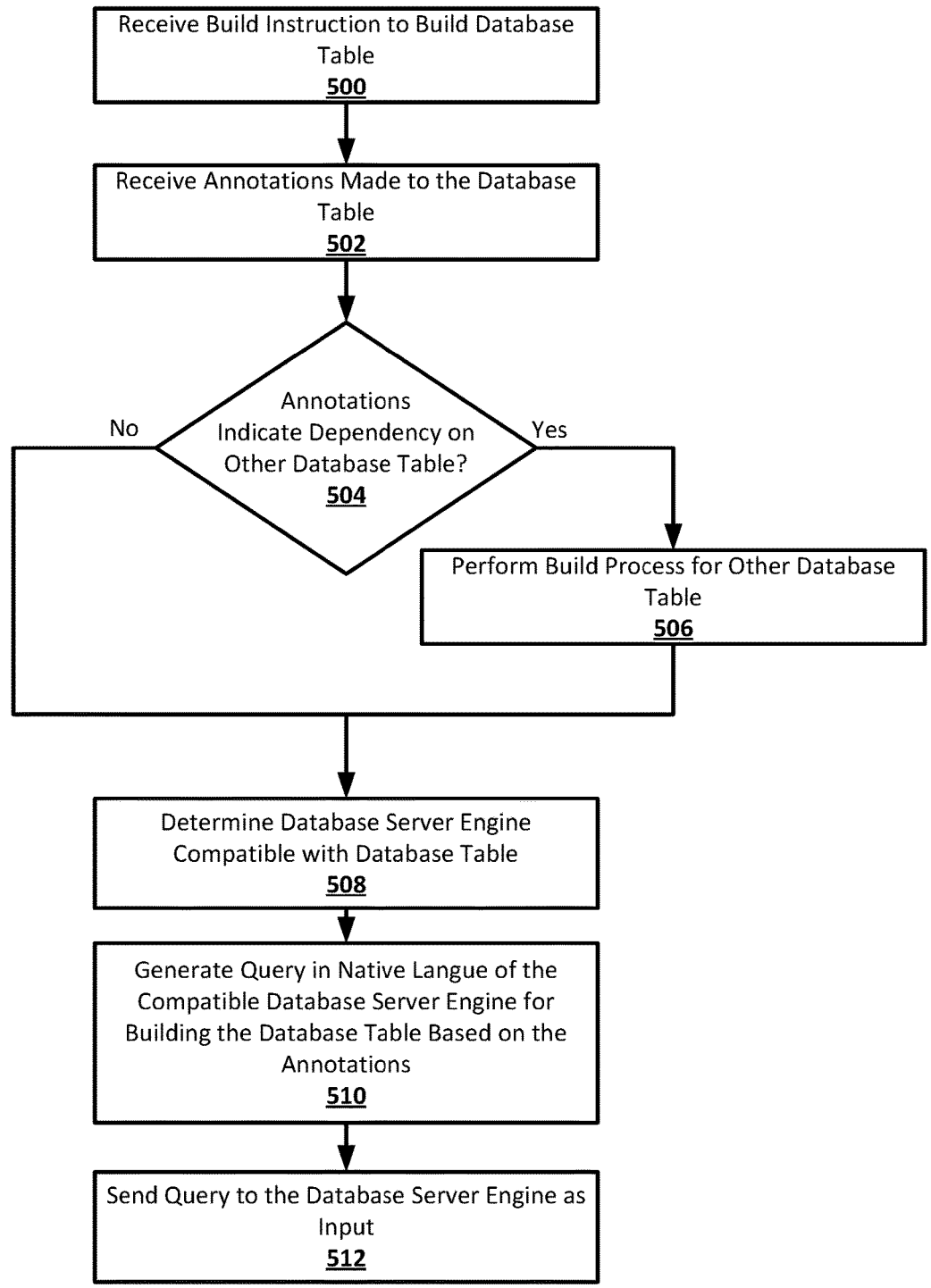
FIG. 5 shows an example procedure suitable for database table annotation processing according to an implementation of the disclosed subject matter.

FIG. 5 shows an example procedure suitable for database table annotation processing according to an implementation of the disclosed subject matter. At 500, a build instruction to build a database table may be received. For example, the annotation processing engine 110 may receive a build instruction from any suitable source on or external to the computing device 100, such as, for example, as a command from a user. The build instruction may instruct the building of a database table from the storage 140, such as, for example, the database table 153, so that the database table may be made available to be queried.

At 502, annotations made to the database table may be received. For example, the annotation processing engine 110 may receive the annotations that were made to the database table being built, such as, for example, the annotations 163. The annotation processing engine 110 may receive the annotations 163 from the storage 140, where they may be stored in any suitable format as metadata for the database table 153.

At 504, if the annotations indicate a dependency on another database table, flow may proceed to 506, otherwise flow may proceed to 508. For example, the annotation processing engine 110 may determine from the annotations 163 that building the database table 153 is dependent on another database table, for example, the database table 152. This may be due to, for example, a join operation between the database table 153 and the database table 152 specified in the annotations 163. This may indicate that the other database table, the database table 152, needs to be built before the database table 152 can be built.

At 506, the build process may be performed for the other database table. For example, the annotation processing engine 110 may first build the database table, for example, the database table 152, upon which the database table that was the subject of the build command, for example, the database table 153, is dependent. This may involve the annotation processing engine 110 starting at 502 and receiving the annotations made to the other database table, and proceeding until the other database table is built by the database server engine 120 after 512. In some instances, the other database table may itself be dependent on another database table, which may be determined by the annotation processing engine 110 at 504 from the annotations made to the other database table. In these instances, the another database table may be built first, including any database table that the another database table is dependent on, and so on recursively until a database table that is not dependent on any other database table is reached and built. This may allow the annotation processing engine 110 to automatically handle dependencies among database table based on the annotations made to the database tables.

At 508, the database serve engine compatible with the database table may be determined. For example, the computing device 100 may include more than one database server engine, such as the database serve engine 120 and the database server engine 420. The annotation processing engine 110 may determine which of the database serve engines on the computing device 100 the database table being built, for example, the database table 153, is compatible with. The annotation processing engine 110 may determine compatibility in any suitable manner. For example, to determine the database server engine that is compatible with the database table 153, the annotation processing engine 110 may check the annotations 163, other metadata about the database table 153, or the structure and features of the database table 153.

At 510, a query in the native language of the compatible database server engine for building the database table may be generated based on the annotations. For example, annotation processing engine 110 may generate a query that, when submitted to the database server engine determined to be compatible with the database table being built, will cause the database serve engine to build the database table in accordance with the annotations. The annotation processing engine 110 may, for example, have determined that the database table 153 is compatible with the database server engine 120. The annotation processing engine 110 may generate a query in the native language of the database server engine 120 that will cause the database serve engine 120 to build the database table 153 based on the annotations 163, including, for example, any filter and join operations specified in the annotations 163.

At 512, the query may be sent to the database server engine. For example, the annotation processing engine 110 may send the generated native language query to the database server engine compatible with the database table. The annotation processing engine 110 may, for example, send the query generated based on the annotations 163 and in the native language of the database server engine 120 to the database server engine 120. The query may cause the database server engine 120 to build the database table 153 in accordance with the annotations 163, resulting in the generation and storage of the built database table 353.

Figure 6:
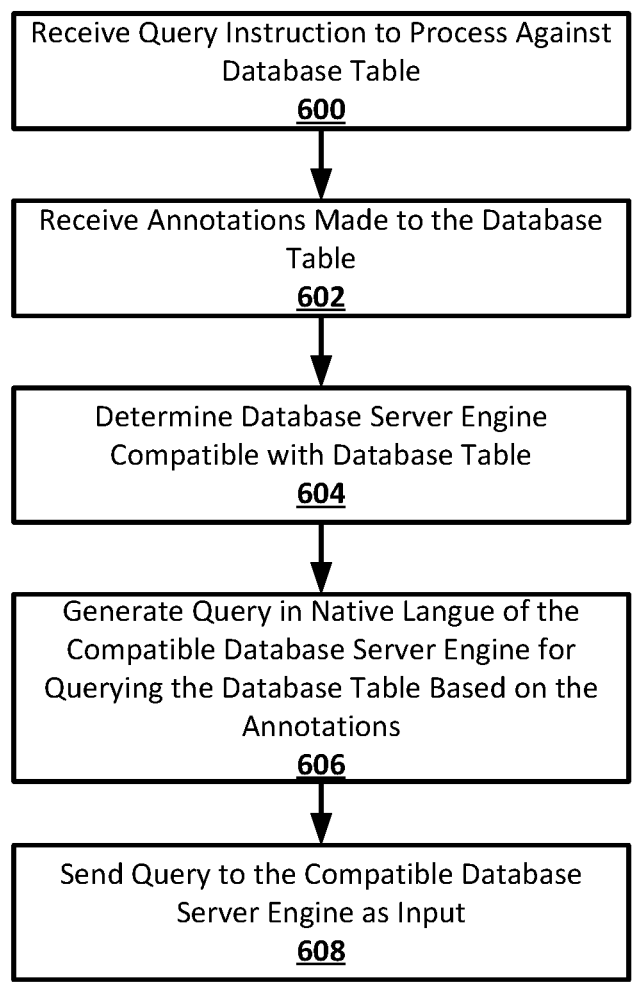
FIG. 6 shows an example procedure suitable for database table annotation processing according to an implementation of the disclosed subject matter.

FIG. 6 shows an example procedure suitable for database table annotation processing according to an implementation of the disclosed subject matter. At 600, a query instruction to be run against a database table maybe received. For example, the annotation processing engine 110 may receive a query instruction from any suitable source on or external to the computing device 100, such as, for example, from user input. The query instruction may specify a query to run against a database table, for example, the database table 353, from the storage 140. The query specified may be any suitable query that may retrieve rows from the queried database table. The query instruction may be written in an annotation language that is used by the annotation processing engine 110 instead of the native language of the database server engine compatible with the database table being queried. This may allow query instructions submitted to the annotation processing engine 110 to be written in the same language and without knowledge of the native language of the database server engine compatible with the database table being queried.

At 602, annotations made to the database table may be received. For example, the annotation processing engine 110 may determine which database table the query instruction specifies that the query be run against, and may receive the annotations made to that database table. For example, the annotation processing engine 110 may determine that the query instruction specifies that the query be run against the database table 353, or the database table 153, and may receive the annotations 163 from the storage 140.

At 604, the database server engine compatible with the database table may be determined. For example, the annotation processing engine 110 may determine which of the database server engines on the computing device 100 is compatible with the database table that the query is to be run against. If the computing device 100 has only one database server engine, for example, the database server engine 120, the annotation processing engine 110 may determine that to be the database server engine compatible with the database table the query is to be run against. If the computing device 100 includes additional database server engines, such as the database server engine 420, the annotation processing engine 110 may determine which of the database server engines is compatible with the database table the query is to be run against in any suitable manner. For example, the annotation processing engine 110 may examine the format of the database table, for example, the database table 153, the query is to be run against, the annotations made to the database table, for example, the annotations 163, or any other metadata associated with the database table that may indicate which database server engine is compatible with the database table.

At 606, a query may be generated in the native language of the compatible database server engine for querying the database table based on the annotations. For example, the annotation processing engine 110 may have determined that the database server engine 110 is compatible with the database table 353, which the query is to be run against, and may generate a query in the native language of the database server engine 110. The generated query may include any query parameters specified in the query instruction received by the annotation processing engine 110, and may incorporate data about the database table 353 from the annotations 153.

At 608, the query may be sent to the compatible database server engine as input. For example, the annotation processing engine 110 may send the query generated in the native language of the database server engine, for example, the database server engine 120, that was determined to be compatible with the database table, for example, the database table 353, the query is to be run against, as input to that compatible database server engine. The database server engine 120 may, for example, receive the query in the native language of the database severe engine 120 as input from the annotation processing engine 110, run the query against the database table 353 as specified in the query, and return the results of running the query against that database table 353 in any suitable manner.

Figure 7:
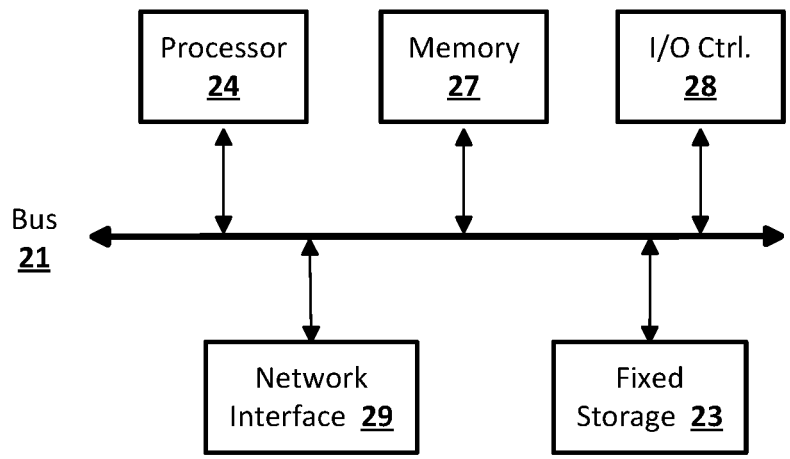
FIG. 7 shows a computer according to an embodiment of the disclosed subject matter.

Embodiments of the presently disclosed subject matter may be implemented in and used with a variety of component and network architectures. FIG. 7 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 8.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 8:
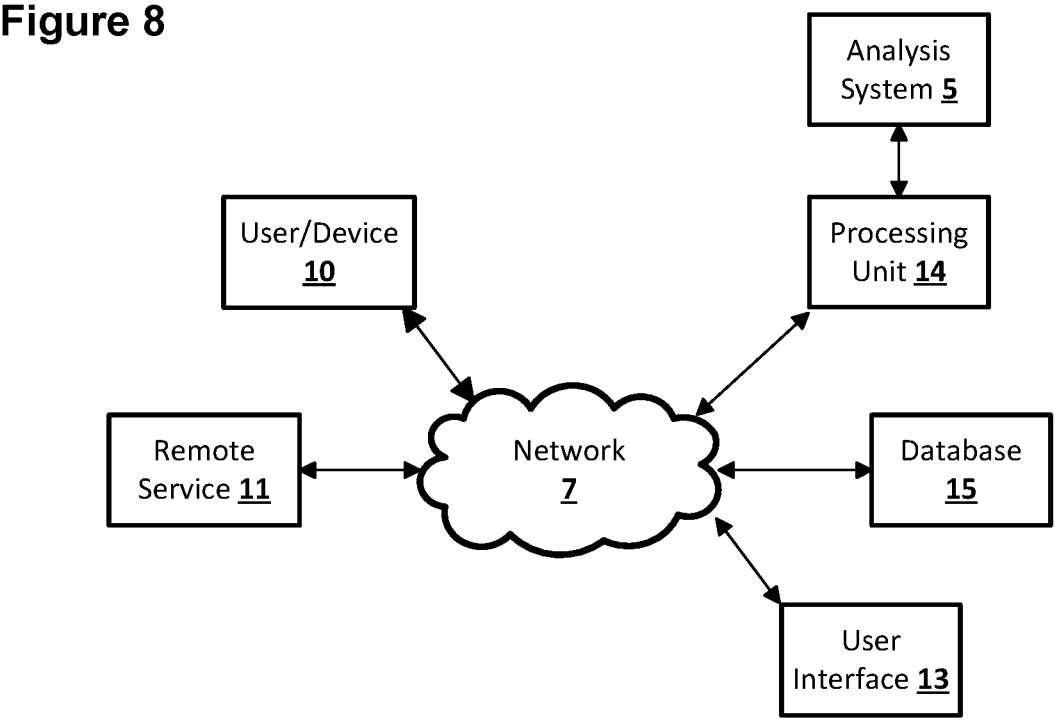
FIG. 8 shows a network configuration according to an embodiment of the disclosed subject matter.

FIG. 8 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database table 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database table 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database table 15 and/or user interface 13. In some arrangements, an analysis system 5 may provide back-end processing, such as where stored or acquired data is pre-processed by the analysis system 5 before delivery to the processing unit 14, database table 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, at an annotation processing engine on a computing device, an instruction to build a database table;
   receiving, at the annotation processing engine on the computing device, annotations made to the database table from a storage of the computing device, the annotations comprising one or more labels identifying features of the database table and at least one join;
   determining, by the annotation processing engine on the computing device, a database server engine compatible with the database table;
   generating, by the annotation processing engine on the computing device, a query in a native language of the database server engine compatible with the database table based on the instruction to build the database table and at least one operation in the annotations made to the database table;
   sending, by the annotation processing engine on the computing device, the query in the native language of the database server engine to the database server engine; and
   building, by the database server engine, the database table according to the query in the native language of the database server engine to generate a built database table.

2. The method of claim 1, further comprising:
   receiving, at the annotation processing engine on the computing device, a query instruction for querying the database table;
   receiving, at the annotation processing engine on the computing device, the annotations made to the database table from the storage of the computing device;
   determining, by the annotation processing engine on the computing device, the database server engine compatible with the database table;
   generating, by the annotation processing engine on the computing device, a second query in the native language of the database server engine compatible with the database table based on the query instruction and the annotations made to the database table; and
   sending, by the annotation processing engine on the computing device, the second query in the native language of the database server engine to the database server engine.

3. The method of claim 2, further comprising running, by the database server engine, the second query in the native language of the database server engine against the built database table.

4. The method of claim 1, further comprising:
   receiving, at the annotation processing engine on the computing device, a second instruction to build a second database table;
   receiving, at the annotation processing engine on the computing device, second annotations made to the second database table from the storage of the computing device, the second annotations comprising one or more labels identifying features of the second database table;
   determining, by the annotation processing engine on the computing device, a second database server engine compatible with the second database table, the second database server engine different from the database server engine;
   generating, by the annotation processing engine on the computing device, a second query in a native language of the second database server engine compatible with the second database table based on the second instruction to build the database table and the second annotations made to the second database table, the native language of the second database server engine different from the native language of the database server engine; and sending, by the annotation processing engine on the computing device, the second query in the native language of the second database server engine to the second database server engine.

5. The method of claim 4, further comprising building, by the second database server engine, the second database table according to the second query in the native language of the second database server engine to generate a built database table.

6. The method of claim 5, further comprising:
receiving, at the annotation processing engine on the computing device, a query instruction for querying the second database table;
receiving, at the annotation processing engine on the computing device, the second annotations made to the second database table from the storage of the computing device;
determining, by the annotation processing engine on the computing device, the second database server engine compatible with the second database table;
generating, by the annotation processing engine on the computing device, a third query in the native language of the second database server engine compatible with the second database table based on the query instruction and the second annotations made to the second database table; and
sending, by the annotation processing engine on the computing device, the third query in the native language of the second database server engine to the second database server engine.

7. The method of claim 1, wherein the query instruction in the native language of the database server engine comprises at least one query operation to be performed by the database server engine when building the database table, and wherein the at least one query operation is specified in the annotations.

8. The method of claim 1, further comprising, before generating, by the annotation processing engine on the computing device, the second query in the native language of the database server engine compatible with the database table based on the query instruction and the annotations made to the database table:
determining, by the annotation processing engine, that the annotations specify an operation that makes building the database table dependent on a second database table;
receiving, at the annotation processing engine on the computing device, second annotations made to the second database table from the storage of the computing device, the second annotations comprising one or more labels identifying features of the second database table;
determining, by the annotation processing engine on the computing device, a database server engine compatible with the second database table;
generating, by the annotation processing engine on the computing device, a query in a native language of the database server engine compatible with the second database table based on the instruction to build the second database table and the second annotations made to the second database table;
sending, by the annotation processing engine on the computing device, the query in the native language of the database server engine to the second database server engine; and
determining, by the annotation processing engine, that the database server engine built the second database table.

9. A computer-implemented system comprising:
a storage; and
a processor that receives, with an annotation processing engine an instruction to build a database table,
receives, with the annotation processing engine, annotations made to the database table from a storage of the computing device, the annotations comprising one or more labels identifying features of the database table and at least one join,
determines, with the annotation processing engine, a database server engine compatible with the database table,
generates, with the annotation processing engine, a query in a native language of the database server engine compatible with the database table based on the instruction to build the database table and at least one operation in the annotations made to the database table,
sends, with the annotation processing engine, the query in the native language of the database server engine to the database server engine, and
builds, with the database server engine, the database table according to the query in the native language of the database server engine to generate a built database table.

10. The system of claim 9, wherein the processor further stores the built database table in the storage.

11. The system of claim 10, wherein the processor further receives, with the annotation processing engine, a query instruction for querying the database table,
receives the annotation processing engine, the annotations made to the database table from the storage of the computing device,
determines, with the annotation processing engine, the database server engine compatible with the database table,
generates, with the annotation processing engine, a second query in the native language of the database server engine compatible with the database table based on the query instruction and the annotations made to the database table, and
sends, with the annotation processing engine, the second query in the native language of the database server engine to the database server engine.

12. The system of claim 11, wherein the processor further runs, with the database server engine, the second query in the native language of the database server engine against the built database table.

13. The system of claim 9, wherein the processor further receives, at the annotation processing engine, a second instruction to build a second database table,
receives, with the annotation processing engine, second annotations made to the second database table from the storage of the computing device, the second annotations comprising one or more labels identifying features of the second database table,
determines, with the annotation processing engine, a second database server engine compatible with the second database table, the second database server engine different from the database server engine, generates, with the annotation processing engine, a second query in a native language of the second database server engine compatible with the second database table based on the second instruction to build the database table and the second annotations made to the second database table, the native language of the second database server engine different from the native language of the database server engine, and sends, with the annotation processing engine, the second query in the native language of the second database server engine to the second database server engine.

14. The system of claim 13, wherein the processor further builds, with the second database server engine, the second database table according to the second query in the native language of the second database server engine to generate a built database table.

15. The system of claim 14, wherein the processor further receives, at the annotation processing engine, a query instruction for querying the second database table;

receives, with the annotation processing engine, the second annotations made to the second database table from the storage of the computing device;

determines, with the annotation processing engine, the second database server engine compatible with the second database table, generates, with the annotation processing engine, a third query in the native language of the second database server engine compatible with the second database table based on the query instruction and the second annotations made to the second database table, and sends, by the annotation processing engine, the third query in the native language of the second database server engine to the second database server engine.

16. The system of claim 9, wherein the query instruction in the native language of the database server engine comprises at least one query operation to be performed by the database server engine when building the database table, and wherein the at least one query operation is specified in the annotations.

17. The system of claim 9, wherein the processor further, before generating, by the annotation processing engine on the computing device, the second query in the native language of the database server engine compatible with the database table based on the query instruction and the annotations made to the database table, determines, with the annotation processing engine, that the annotations specify an operation that makes building the database table dependent on a second database table, receives, with the annotation processing engine, second annotations made to the second database table from a storage of the computing device, the second annotations comprising one or more labels identifying features of the second database table, determines, with the annotation processing engine on the computing device, a database server engine compatible with the second database table, generates, with the annotation processing engine, a query in a native language of the database server engine compatible with the second database table based on the instruction to build the second database table and the second annotations made to the second database table;

sends, with the annotation processing engine, the query in the native language of the database server engine to the second database server engine; and determines, with the annotation processing engine, that the database server engine built the second database table.

18. A system comprising: one or more computers and one or more storage devices storing instructions which are operable, when executed by the one or more computers, to cause the one or more computers to perform operations comprising:

receiving, at an annotation processing engine on a computing device, an instruction to build a database table;

receiving, at the annotation processing engine on the computing device, annotations made to the database table from a storage of the computing device, the annotations comprising one or more labels identifying features of the database table and at least one join;

determining, by the annotation processing engine on the computing device, a database server engine compatible with the database table;

generating, by the annotation processing engine on the computing device, a query in a native language of the database server engine compatible with the database table based on the instruction to build the database table and at least one operation in the annotations made to the database table;

sending, by the annotation processing engine on the computing device, the query in the native language of the database server engine to the database server engine; and building, by the database server engine, the database table according to the query in the native language of the database server engine to generate a built database table.

19. The system of claim 18, wherein the instructions which are operable, when executed by the one or more computers, to cause the one or more computers to perform operations further comprises instructions which are operable, when executed by the one or more computers, to cause the one or more computers to perform operations comprising:

receiving, at the annotation processing engine on the computing device, a second instruction to build a second database table;

receiving, at the annotation processing engine on the computing device, second annotations made to the second database table from the storage of the computing device, the second annotations comprising one or more labels identifying features of the second database table;

determining, by the annotation processing engine on the computing device, a second database server engine compatible with the second database table, the second database server engine different from the database server engine;

generating, by the annotation processing engine on the computing device, a second query in a native language of the second database server engine compatible with the second database table based on the second instruction to build the database table and the second annotations made to the second database table, the native language of the second database server engine different from the native language of the database server engine; and sending, by the annotation processing engine on the computing device, the second query in the native language of the second database server engine to the second database server engine.

* * * * *